3,349,060
POLYEPOXIDE CARBOCYCLIC DIAMINE COMPOSITIONS
Reginald Norman Lewis, Olton, and Ian Raoul Horne, Acocks Green, Birmingham, England, assignors to Bakelite Limited, London, England, a British company
No Drawing. Filed Feb. 20, 1964, Ser. No. 346,120
4 Claims. (Cl. 260—47)

This invention is for improved polyepoxide compositions and a process for making them; it also relates to products embodying such compositions in hardened form.

It is already known to produce hardened epoxide resins by reacting them with a carbocyclic diamine containing two isolated carbocyclic radicals linked by a short chain bivalent bridge radical, each carbocyclic radical having one amino group and the diamine containing at least three active hydrogen atoms attached to nitrogen atoms. Hardenable compositions of this type are described in British patent specification No. 791,836 which describes and claims a hardenable mixture comprising a glycidyl compound containing on an average more than one epoxy group in the molecule and as a hardening agent between 50% and 300% of the stoichiometrical amount of a carbocyclic diamine containing two isolated carbocyclic radicals which are linked by a short chain bivalent bridge radical, each carbocyclic radical having one amino group, one amino group containing two hydrogen atoms and the other amino group containing one or two hydrogen atoms. This prior specification discloses that the diamine containing two isolated carbocyclic radicals can be replaced with an amount up to 50% of the equivalent amount of another polyamine or amine for example butylamine; such other amines may be employed in order to speed up the hardening process.

The present invention provides a polyepoxide composition formed by reacting a polyepoxide possessing more than one terminal epoxide group per average molecule with a proportion of a carbocyclic diamine which contains two isolated carbocyclic radicals which are linked by a short chain bivalent bridge radical, each carbocyclic radical having one amine group and the diamine containing at least three reactive hydrogen atoms attached to the nitrogen atoms, which proportion of the carbocyclic diamine is such that the reaction product is capable of being dissolved in a solvent for the composition and capable of being cured to form an infusible and insoluble product. The polyepoxide compositions are prepolymers which while not possessing the property of spontaneously hardening may be readily hardened by the use of conventional hardeners for epoxide resins.

The polyepoxides used in the invention may be the polyglycidyl ethers of diphenylol propane.

The carbocyclic radicals may be aromatic or cycloaliphatic and the short chain bivalent bridge radical may be, for instance, —$(CH_2)_n$—, —NH—, —O—, —S— or —$SO_2$—. Examples of carbocyclic diamines which may be employed in the invention are, parapara'-diaminodiphenylmethane, diaminodicyclohexylamine or diaminodiphenylsulphone. Further examples and description concerning the carbocyclic diamines is disclosed in British patent specification No. 791,836.

Special solid epoxide resins providing a narrow band of molecular sizes and which may be made by reacting 1 molecular proportion of epichlorhydrin with two molecular proportions of diphenylolpropane and subsequently reacting the resulting resinous intermediate with a further quantity of epichlorhydrin in excess of that required to convert all the phenolic hydroxyl groups into glycidyl ether groups may be advantageously used in preparing the prepolymers of the invention.

The absence of components of low molecular weight in the prepolymers results in the penetration being minimised when the prepolymers are used for paper coating.

If a proportion below approximately 46% of the stoichiometrically equivalent amount of carbocyclic diamine required for reaction with all epoxide groups is reacted with a polyepoxide the product will be incapable of spontaneous hardening at 25° C. The exact limiting quantity will be somewhat variable depending on the functionality of the reactants. Polyepoxides of higher functionality than two will tend to produce a product with a greater degree of cross-linking and in these cases the limiting proportion of carbocyclic diamine may be somewhat lower than 46%.

Useful products have been obtained by using a proportion of carbocyclic diamines between 30% and 45%, and preferably the proportion is between 40 and 45% of the stoichiometrically equivalent quantity required for reaction with all the expoxide groups of the polyepoxide.

The polyepoxide compositions of the invention may be readily hardened by adding conventional hardeners for epoxide resins either of the catalytic or addition types. A simple way of hardening the compositions is by adding further quantities of the carbocyclic diamine which was reacted into the resinous composition. The quantity required will generally be less than the amount required to harden the original polyepoxide and satisfactory results are obtained when the total amount of carbocyclic diamine including that reacted into the resin provides the stoichiometrically equivalent quantity to the epoxide groups of the polyepoxide.

It is, however, not necessary to use the same carbocyclic diamine as a hardener and other carbocyclic diamines or other hardeners may be used satisfactorily.

It has been discovered that the resinous compositions of the invention may be hardened by means of catalytic hardeners. Small amounts of certain catalytic hardeners such as stannous octoate and s-trisdimethylaminoethyl phenol cause rapid and efficient hardening of the polyepoxide compositions of the invention. Hardenable compositions embodying such catalytic hardeners have the advantage of being relatively stable at room temperature while providing a rapid rate of cure at moderately elevated temperatures of the order of 130° C. to 150° C. This property makes such compositions advantageous for use in coating paper and metals.

Acids and acid anhydrides may also be used as hardeners, and in particular certain hydroxy polybasic acids such as tartaric and citric acids used in small amounts provide compositions stable at room temperature but which will harden very rapidly at a temperature of about 130° C.

An advantage of the polyepoxide compositions of the invention is that they form grindable solid resins of high molecular weight. They are therefore useful in a variety of applications where a high molecular weight resin is required. A particular advantage of the polyepoxide compositions of the invention when used for coating paper is that a very high output rate may be secured as the curing or hardening of the resin may be effected rapidly.

For instance, they may be used in the manufacture of moulding compositions where it is advantageous for the resinous binder to be a solid grindable resin and to possess a viscosity sufficiently high when heated to allow the composition to be processed satisfactorily on heated rolls. Another application for such a grindable high molecular weight is in the formulation of coating compositions particularly when these are to be applied by the fluidised bed process. The polyepoxide compositions according to the invention may also be applied with advantage in the manufacture of adhesives and in treating paper for the manufacture of laminates.

The use of the carbocyclic diamines in the manufacture of precondensates in accordance with this invention yields epoxide compositions which are advantageous in respect of economic considerations. The epoxide compositions are capable of being processed speedily in the final curing steps, more particularly when the precondensate is formed from 40% or more of a diamine such as diaminodiphenylmethane; this particularly applies when the compositions are used in solution in the manufacture of, for example, laminates based on paper.

The invention also includes products such as mouldings, laminates and hardened compositions wherein said composition is in the form of a coating upon a substrate, which product comprises the polyepoxide compositions of the invention, and may in addition include cellulosic or mineral fillers either in particulate or sheet form.

The invention also includes hardenable and hardened compositions formed by mixing and reacting hardeners of the addition or catalytic types with the compositions of the invention.

Following is a description by way of examples of methods of carrying the invention into effect. Throughout the description the term "parts" denotes "parts by weight."

Example I

A varnish "A" was made from:

| | Parts |
|---|---|
| Epoxide resin (epoxide equivalent 400) (a solid resin consisting of polyglycidyl ethers of diphenylolpropane) | 100 |
| Diaminodiphenylmethane (an amount containing sufficient active hydrogen atoms to react with 44% of the epoxide groups in the resin) | 5.5 |
| Methyl Cellosolve (registered trademark) | 86 | by dissolving the epoxide resin in the methyl Cellosolve adding the diaminodiphenylmethane and refluxing until the value of the gel time of a mixture of 100 parts of the varnish with 4 parts of diaminodiphenylmethane dissolved in 8 parts of methyl ethyl ketone, measured on a hot plate at 130° C. fell to about 2¾ minutes. The mixture was then cooled and discharged through a filter to storage.

Varnish A was converted into a hardenable composition, Varnish B, by mixing with it a quantity of citric acid as a hardener in accordance with the formula:

| | Parts |
|---|---|
| Varnish A | 100 |
| Citric acid (as a 40% solution in methyl Cellosolve) | 3.6 |

Varnish B was used in the preparation of a thermosetting laminate for industrial application by treating 5 mil kraft paper with the varnish in an impregnator to a resin content of 50%, so that the solvent was evaporated and the resin polymerised to a condition which would make it suitable for moulding. The dried impregnated paper was then cut into rectangular sheets of suitable size and a laminate prepared by moulding assemblies of sheets between stainless steel metals in a steam heated multidaylight press at a temperature of 150° C. using a pressure of 1000 lb./in.²

Example II 380 parts epoxide resin of epoxide equivalent 400 (a solid resin prepared by reacting 1 molecular proportion of epichlorhydrin with two molecular proportions of diphenylolpropane and subsequently reacting the resulting resinous intermediate with a further quantity of epichlorhydrin in excess of that required to convert all the phenolic hydroxyl groups into glycidyl ether groups was melted by warming to 90° to 100° C. and 15 parts of diaminodiphenylmethane added (an amount containing sufficient active hydrogen atoms to react with 30% of the epoxide groups in the resin). The mixture was heated slowly to 150° C. and maintained at this temperature for about 7 hours. The resin was then discharged into trays and cooled to form a brittle product which was cracked and ground to pass a 200 B.S.S. mesh sieve (Resin X).

The following raw materials were blended:

| | Parts |
|---|---|
| Resin X | 100 |
| Phthalic anhydride | 21 |
| U.S.B. 110 (a proprietary boron containing catalyst sold by the U.S. Borax Co.) | 1.5 |
| Calcined clay | 150 |
| Calcium stearate | 7.5 |
| Silica flour | 50 |

The mixture was processed on heated differential rolls (front roll 60° C. and back roll 100° C.) for 3 to 3½ minutes to give a ⅛ in. sheet. After cooling the sheet was ground through a 3/16 in. screen and moulded under heat and pressure to give a moulded insulator.

Example III

This example describes the preparation of a resinous composition for fluidised bed coatings.

The following raw materials were blended to form a well-mixed powdery mass:

| | Parts |
|---|---|
| Resin X | 100 |
| Phthalic anhydride | 22.3 |
| Symmetric tris-dimethylaminomethyl phenol | 2.5 |
| Epoxidised soya bean oil (such as paraplex G62) | 4 |
| China clay | 35 |
| Bentone 27 (supplied by F. W. Berk Ltd.) | 2.5 |

The mixture was fluxed for one to three minutes on differential speed rollers at a temperature of 75° C., removed as a sheet, cooled and ground to a fine powder passing a B.S. 60 sieve.

The powder was fluidised with an upward diffused current of dry air in a suitable container. 16 gauge aluminium panels 2 inch by 4 inch were coated by preheating at 200° C. immersing them for five seconds in the fluidised powder and then post curing for one hour at 200° C.

The resulting coatings were dark brown in colour and had a good gloss and appearance. The cured coating did not soften appreciably when heating to 190° C.

Example IV

A moulding material was made as described in Example II but using Resin Y in place of Resin X.

Resin Y was made by reacting 180 parts of liquid epoxide resin (of epoxide equivalent 180) (a liquid resin consisting mainly of the diglycidyl ether of diphenylolpropane) by warming to 100° C. with 15 parts of diaminodiphenylmethane (an amount containing sufficient active hydrogen atoms to react with 30% of the epoxide groups in the resin) for about 7 hours. The resin was then discharged into trays and cooled to form a brittle product which was cracked and ground to pass a 200 B.S.S. sieve.

| | Parts |
|---|---|
| Resin Y | 100 |
| Diaminodiphenylsulphone | 18 |
| Trimellitic anhydride | 3 |
| Calcined clay | 150 |
| Calcium stearate | 7.5 |
| Silica flour | 50 |

The mixture was processed on heated differential rolls (front roll 60° C. and back roll 100° C.) for 3 to 3½ minutes to give a ⅛ in. thick sheet. After cooling the sheet was ground through a 3/16 inch screen and moulded under heat and pressure to give a moulded insulator.

We claim:

1. A polyepoxide composition formed by reacting a polyepoxide, which polyepoxide possesses at least two terminal oxirane epoxide groups per average molecule, with 30% to 45% of the stoichiometric equivalent of a carbocyclic diamine, which diamine contains two isolated carbocyclic radicals each having 6 carbon atoms linked by a short chain bivalent bridge radical selected from the group consisting of —(CH$_2$)$_n$—, —NH—, —O—, —S—, or —SO$_2$—, each of said two carbocyclic radicals having one amino group, the diamine containing at least three reactive hydrogen atoms attached to the nitrogen atoms in the amino groups, which proportion of the carbocyclic diamine is such that the product of the reaction is capable of being dissolved in a solvent for the composition and is capable of being cured to form an infusible and insoluble product.

2. A composition as claimed in claim 1 wherein the polyepoxide is a polyglycidyl ether of diphenylol propane.

3. A composition as claimed in claim 1 wherein the carbocyclic diamine is parapara'-diaminodiphenylmethane or diaminodiphenylsulphone.

4. A composition as claimed in claim 1 wherein the said proportion is between 40 and 45%.

References Cited

UNITED STATES PATENTS

| | | | |
|---|---|---|---|
| 2,773,048 | 12/1956 | Formo et al. | 260—47 |
| 2,981,711 | 4/1961 | Meyer et al. | 260—47 |
| 3,155,743 | 11/1964 | Newey | 260—47 |
| 3,201,360 | 8/1965 | Proops et al. | 260—47 |

FOREIGN PATENTS

| | | |
|---|---|---|
| 711,592 | 7/1954 | Great Britain. |

WILLIAM H. SHORT, *Primary Examiner.*

T. D. KERWIN, *Assistant Examiner.*